United States Patent
Tomita (10) Patent No.: US 6,895,092 B2
(45) Date of Patent: May 17, 2005

(54) CRYPTOGRAPHIC KEY DISTRIBUTION METHOD AND APPARATUS THEREOF

(75) Inventor: Akihisa Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 778 days.

(21) Appl. No.: 09/933,172

(22) Filed: Aug. 21, 2001

(65) Prior Publication Data

US 2002/0025041 A1 Feb. 28, 2002

(30) Foreign Application Priority Data

Aug. 23, 2000 (JP) ........................................ 2000-252656

(51) Int. Cl.[7] ............................................. G06F 17/00
(52) U.S. Cl. ...................................... 380/278; 380/256
(58) Field of Search ................................ 380/277–278, 380/255–257, 41

(56) References Cited

U.S. PATENT DOCUMENTS 5,515,438 A * 5/1996 Bennett et al. ............. 380/278
5,764,765 A * 6/1998 Phoenix et al. ............. 380/256
6,529,601 B1 * 3/2003 Townsend ................... 380/277

FOREIGN PATENT DOCUMENTS

JP 2000101570 4/2000

OTHER PUBLICATIONS

Experimental investigation of the performance limits for first telecommunications–window quantum cryptography systems□□Townsend, P.D.;□□Photonics Technology Letters, IEEE, vol.: 10, Issue: 7, Jul. 1998 □□pp.:1048–1050.*
An autocompensating fiber–optic quantum cryptography system based on polarization splitting of light□□Bethune, D.S.; Risk, W.P.;□□Quantum Electronics, IEEE Journal of, vol.: 36, Issue: 3, Mar. 2000 □□pp.:340–347.*
Synchronization of chaotic lasers by optical feedback for cryptographic applications□□Annovazzi–Lodi, V.; Donati, S.; Scire, A.;□□Quantum electronics, IEEE Journal of, vol.: 33, Issue: 9, Sep. 1997 □□pp.:1449–1454.*
Bennett et al., "Quantum Public Key Distribution System", IBM Technical Disclosure Bulletin, vol. 28, No. 7 Dec. 1985, pp. 3153–3163.
Bennett, "Quantum Cryptograph Using Any Two Nonorthogonal States", Physical Review Letters, Vo. 68, No. 21, May 25, 1992, pp. 3121–3124.
Yuen et al., "Classical noise–based cryptograph similar to two–state quantum cryptography", Physics Letters, A 241, 1998, pp. 135–138.

* cited by examiner

Primary Examiner—David Jung
(74) Attorney, Agent, or Firm—Foley & Lardner LLP (57) ABSTRACT

A cryptographic key distribution method, in which coherent light being suitable for optical fiber communication network is used and high security is secured, is provided. A sending end encodes random numbers so that symmetry probability distributions can be obtained at a receiving end, and also sets light intensity and a modulation index of signal light radiating from the sending end so that the SNR of an eavesdropper is less than 2 dB even when said eavesdropper uses a most suitable receiving equipment at the sending end, and also so that the SNR of the receiving end is more than −10 dB, and transmits signals. The receiving end calculates probability distributions of obtained signals and sets a discrimination threshold value after a set of random numbers was transmitted from the sending end. When the probability distributions have some abnormal states, it is judged that the eavesdropper exists, and distributing the cryptographic key is stopped and a fresh cryptographic key is distributed again.

11 Claims, 7 Drawing Sheets

CRYPTOGRAPHIC KEY DISTRIBUTION METHOD AND APPARATUS THEREOF

BACKGROUND OF THE INVENTION

The present invention relates to a cryptographic key distribution method and an apparatus thereof, in particular, in which the security in communication can be secured against eavesdroppers by using a physical law.

DESCRIPTION OF THE RELATED ART

At a case that information is communicated between a sender and a receiver, even when the communication is intercepted by an eavesdropper, the security of the information can be secured and the alternation of the information can be prevented, by that both the sender and receiver share a group of high security random numbers (cryptographic key). At a method, in which a cryptographic key whose security is proved absolutely on the information theory, that is, whose length is the same as a general sentence, is used for the communication of the information, the cryptographic key used once is definitely discarded. Therefore, the cryptographic key is used only once and a fresh cryptographic key must be always distributed, consequently this is unrealistic.

When a method, which has been proposed as a quantum cryptographic key distribution method based on that its security is given by the quantum theory, is used, its cryptographic key can be shared only between the sender and the receiver. With this, it is known that the communication can be performed in an absolutely safe state. At this quantum cryptographic key distribution method, as far as the basis of state is known beforehand, the quantum state can not be measured exactly based on the law of the quantum theory, therefore the presence of an eavesdropper is detected as that errors are increased on the transmission. A quantum public key distribution system is described in IBM Technical Disclosure Bulletin, volume 28, pp. 3153–3163, 1985, by C. H. Bennett and G. Brassard. And also a quantum cryptography using any two non-orthogonal states is described in Physical Review Letters, volume 68, pp. 3121–3124, 1992, by C. H. Bennett. In this Letters, a method used the two non-orthogonal states being suitable for the transmission by optical fibers is described. At the quantum cryptography, the physical law guarantees its security of the cryptography, therefore the ultimate security of the cryptography not depending on the limit of the ability of a computer can be secured.

However, at the conventional quantum cryptography protocol mentioned above, it is necessary that information of one bit is transmitted by using a single photon. Consequently, a photon measuring method whose quantum efficiency is low must be used to detect light, therefore there is a problem that its transmission efficiency is low. And signals are carried by polarized light and phases of light, and are liable to be influenced by disturbance on the optical transmission channel, therefore there is a problem that the cryptography may not be transmitted in high security caused by increasing the error rate. And coherent light must be used on the optical transmission channel, therefore an optical amplifier cannot be used, consequently existing optical fiber network cannot be used. Therefore there is a problem that a leased channel must be used and the cost installing the leased channel becomes large for the user.

U.S. Pat. No. 5,515,438 by C. H. Bennett and S. J. Wiesner describes a quantum key distribution using non-orthogonal macroscopic signals. In this patent, a quantum key distribution method using coherent light applied a very weak modulation is described. In this method, for example, when average N photons are transmitted, signals, to which two kinds of modulation are applied, such as (Ncos 2 ($\Pi/4-\delta$), Ncos2 ($\Pi/4+\delta$)) and (Nsin 2 ($\Pi/4-\delta$), Nsin2 ($\Pi/4+\delta$)), is used corresponding to ("1", "0"). However, when the modulation index $\delta$ is chosen to be a small value so that the size of the fluctuation by the measurement becomes more than the same level of the size of the modulation, the light state cannot be decided exactly by the measurement. Moreover, by using two independent signals, the security similar to a quantum cryptography used four states proposed by C. H. Bennett and G. Brassard can be expected. However, two signals are required to transmit one bit by the protocol. Furthermore, a quantum communication channel, in which phase coherence between the two signals is secured, is required, with this, the security at the cryptography transmission becomes weak by the disturbance.

And a classical noise-based cryptography similar to two-state quantum cryptography is described in Physics Letters, volume A241, pp. 135–138, 1998, by H. P. Yuen, and A. M. Kim. In this Letters, a concrete protocol for a cryptographic key distribution that can be used by even weak coherent light is given, and it is shown that the security is secured by an essentially similar theory to the quantum cryptography used the tow non-orthogonal states. In this protocol, the light is not necessary to be coherent light on the optical transmission channel and the existing optical fiber network can be used.

In the protocol by H. P. Yuen and A. M. Kim, "0" and "1" are coded so that the "0" and "1" are received in a symmetry probability distribution. The sender transmits coded signals on weak coherent light. At normal communication, the difference between the "0" and "1" is discriminated by using a threshold value V=0. However, at this protocol, $V_{th}=\pm mS$ is made to be a threshold value for the "1" and "0", in this, the S is an average value of amplitude of signals. Therefore, received signals are discriminated as three types "1", "0", and "not discriminative", like a quantum cryptography used the two non-orthogonal states. The receiver informs the sender of the position of a bit being "not discriminative" and discards this bit. A bit sequence, which the receiver could discriminate "1" from "0", includes errors, therefore the sender and the receiver exchange the bits and obtain a bit sequence having no errors. After correcting the errors, the sender and the receiver obtain a cryptographic key having high security by strengthening its security for the remaining bits by using a hash function.

The protocol by H. P. Yuen and A. M. Kim makes the following natures the base of the security. The signals are transmitted by weak coherent light, therefore the signal to noise ratio (SNR) is low and errors occur in a not ignoring rate when the threshold value is made to be "0". On the other hand, when the threshold value is made to be higher, the number of bits that are made to be "not discriminative" increases, but the error rate of the remaining bits can be made to be small enough. At a case that an eavesdropper exists, the eavesdropper must make the threshold value for the discrimination "0". Because, noise adding to signals to the receiver and the eavesdropper is not correlated with each other, therefore the probability, which the eavesdropper can discriminate the same bits discriminated by the receiver at the same time, becomes low, when the threshold value of the eavesdropper is not "0". The amount of information of the bits not discriminated is "0", and the error is smaller than 0.5 when the bit is discriminated with that the threshold value is "0", therefore it is advantageous for the eavesdropper to obtain the information by making the threshold value "0". At this time, the bits, whose errors are low for the receiver, become bits having large errors for the eavesdropper. Consequently, the amount of information for the eavesdropper becomes smaller than that for the receiver, and the eavesdropping ends in failure. And when the eavesdropper attacks the receiver by that the eavesdropper absorbs all the transmitted signals and resends the results of the discrimination, the receiver can detects the presence of the eavesdropper by that the error rate at the receiver end increases extraordinarily when the error rate of the eavesdropper exceeded 10%.

However, when the eavesdropper exists at a place being very near to the sender, the SNR of the eavesdropper is high, therefore the error for the bits, which is obtained by the eavesdropper, becomes low when the signals are discriminated by that the threshold value is made to be "0". In this case, the eavesdropping becomes possible, therefore when the system is designed, the limitation of the SNR of the eavesdropper with which the security can be secured theoretically must be clear. The protocol by H. P. Yuen and A. M. Kim does not study about this matter, and there is a problem that the system designing, in which the cryptographic key can be distributed in high security even when an eavesdropper exists, cannot be fully performed. Moreover, when the eavesdropper discriminates bits with the threshold value not being "0" and attacks the receiver by resending only bits that eavesdropper could discriminate, the average number of photons that the receiver receives is not changed to be that at the time when the eavesdropping does not exist, when the strength of resending signals is made to be large. Consequently there is a problem that the error at the receiver is reduced and the eavesdropping is liable to be successful. Japanese Patent Application Laid-Open No. 2000-101570 discloses a quantum cryptography communication system. In this application, a cryptographic system based on a theory similar to by H. P. Yuen and A. M. Kim is disclosed. However, the SNR of the eavesdropper is not studied.

SUMMARY OF THE INVENTION

It is therefore an object of the present invention to provide a cryptographic key distribution method and an apparatus thereof, in which an existing optical communication network can be used without using a quantum communication channel and also the security can be secured.

According to the present invention for achieving the object mentioned above, there is provided a cryptographic key distribution method at a cryptographic key distribution apparatus in which a sender transmits signal light to a receiver through an optical transmission channel. And the sender provides the steps of setting light intensity and a modulation index of outputting signal light so that the signal to noise ratio (SNR) of an eavesdropper is smaller than 2 dB even when the eavesdropper eavesdrops at the sending end by using any receiving equipment and also the SNR of the receiver at the receiving end is larger than −10 dB, and transmitting signal light modulated by modulation signals that a random number sequence was coded. And the receiver provides the steps of, receiving the signal light of the random number sequence transmitted from the sender, calculating the probability distributions by using the frequency (occurrence times) distributions of the received signal light having fluctuation caused by that noise was added, judging whether the eavesdropper exists or not based on changes of the probability distributions, and also setting a discrimination threshold value so that the error rate of the receiver is 5% or less, discriminating the bit value of each bit in the random number sequence based on the discrimination threshold value, and informing the sender of the positions of bits that the receiver could discriminated, and taking out only the bit sequence having no errors in the discrimination, and sharing the bit sequence having no errors with the sender. And the shared bit sequence is made to be the cryptographic key.

According to the present invention, at the cryptographic key distribution method, the random number using in the random number sequence is a binary random number, and the calculated probability distributions have a peak respectively (that is, two peaks) corresponding to the binary number at the receiving end, and the binary random number sequence is coded so that the calculated probability distributions become the probability distributions being symmetry each other. And Manchester codes are used for coding the binary random number. And it is confirmed that the calculated probability distributions have the peak respectively (that is, two peaks) and are symmetry corresponding to the binary number (0,1), and when such probability distributions are not confirmed, it is judged that the eavesdropper exists at the cryptographic key distribution, and the distribution of the cryptographic key is stopped and a fresh cryptographic key is distributed again. And when the cryptographic key is distributed, management information composed of clock signals, the light intensity and the modulation index of the transmitting signal light is transmitted to the receiver by using a transmission channel being independent of the optical transmission channel for the cryptographic key distribution. And the receiver calculates a light intensity expectation value of receiving signal light, estimating from received light intensity information of the sending end and a known transmission channel loss, and compares the calculated result with the light intensity of actually received signal light, and judges an abnormal state of the optical transmission channel based on the difference between the calculated value and the actually received value, and decides to stop distributing the cryptographic key based on the judged result.

According to the present invention, there is provided a cryptographic key distribution apparatus. The cryptographic key distribution apparatus provides a transmitting apparatus that radiates signal light modulated by a coded random number sequence, an optical transmission channel that transmits the signal light radiated from the transmitting apparatus, and a receiving apparatus that receives the signal light transmitted through the optical transmission channel. And the receiving apparatus decodes the signal light received through the optical transmission channel, and calculates the probability distributions from the frequency (occurrence times) distributions of decoded signals having fluctuation caused by that noise was added, and judges whether an eavesdropper exists or not based on changes of the probability distributions, and also sets a discrimination threshold value so that the error rate of the receiving apparatus is 5% or less, and discriminates a bit value of each bit of the random number sequence based on the discrimination threshold value, and transmits positions of bits that the receiving apparatus could discriminate to the transmitting apparatus. And an average number of photons $N(N \geq 1)$ per one pulse of the signal light radiating from the transmitting apparatus, a modulation index $\delta$ of the signal light radiating from the transmitting apparatus, and a transmission loss L at the optical transmission channel satisfy following equations (1) and (2).

$$\delta \leq 0.8/N \quad (1)$$

In this, Nn signifies the noise level of the receiving apparatus and can be calculated beforehand.

According to the present invention, at the cryptographic key distribution apparatus, by satisfying the equations (1) and (2) mentioned above, even when the eavesdropper eavesdrops by using any receiving equipment at the sending end, the SNR of the eavesdropper becomes less than 2 dB, and also the SNR of the receiving apparatus at the receiving end becomes more than −10 dB. Therefore, the cryptographic key distribution can be performed in high security against the eavesdropper.

According to the present invention, at the cryptographic key distribution apparatus, the transmitting apparatus provides a first light source, a clock generator, a random number generator that generates random numbers based on clocks generated by the clock generator, an encoder that encodes the random numbers generated at the random number generator, a first modulator that modulates light from the first light source based on signals encoded at the encoder and makes the modulated signals signal light, an attenuator that attenuates light intensity of the signal light outputted from the first modulator to about a noise level, a second light source that generates light using for clock light, a second modulator that modulates light from the second light source based on clocks generated at the clock generator and makes the modulated signals clock light, and a multiplexer that multiplexes the signal light outputted from the attenuator and the clock light outputted from the second modulator and outputs the multiplexed light to the optical transmission channel. And the receiving apparatus provides a wavelength de-multiplexer that divides received signals transmitted through the optical transmission channel into the signal light and the clock light, a clock reproducer that converts the clock light inputted from the wavelength de-multiplexer into electric clocks, a decoding detector that decodes the signal light inputted from the wavelength de-multiplexer and converts the decoded signal light into electric signals, and an operating unit that measures the frequency (occurrence times) distributions of the electric signals having fluctuation caused by that noise was added from the decoding detector based on the clocks from the clock reproducer, and calculates the probability distributions from the frequency distributions, and judges whether an eavesdropper exists or not based on changes of the probability distributions, and sets the discrimination threshold value so that the error rate of the receiving apparatus is 5% or less, and discriminates a bit value of each bit of the random number sequence based on the discrimination threshold value, and transmits positions of bits that the operating unit could discriminate to the transmitting apparatus. And the clock reproducer provides a light detector that converts the clock light into electric signals, and a clock reproducing circuit that forms the electric signals from the light detector into waveforms. And the decoding detector provides a 50%-50% wavelength de-multiplexer that divides the signal light inputted from the wavelength de-multiplexer into two components at the dividing ratio is 1 to 1, a delay circuit that delays one of the signal light divided at the 50%-50% wavelength de-multiplexer, and a balanced detector that converts the difference between the signal light inputted from the delay circuit and the signal light inputted from the 50%-50% wavelength de-multiplexer into electric signals. And the encoder in the transmitting apparatus encodes the random number sequence so that the probability distributions calculated at the receiving apparatus has a peak respectively (that is, two peaks) corresponding to binary and are symmetry with each other. And Manchester codes are used at coding the random number sequence. In this, the binary random number is used as the random number and is coded so that the probability distributions at the receiving end have a peak respectively and are symmetry each other, that is, there are two peaks. The binary random number is used is the following reasons. When the binary number (0,1) is discriminated, as the same as at the quantum cryptography, the three discrimination states "0","1", and "not discriminative" are obtained, and the cryptographic key can be distributed in high security against the eavesdropper.

According to the embodiment of the present invention, when the error rate of the eavesdropper exceeds 10%, as far as that the deterioration of the SNR of the receiver caused by the eavesdropping is 12 dB or less, it is clear that the cryptographic key can be distributed in high security. The SNR of the eavesdropper becomes best, when the eavesdropper is adjacent to the sender and uses the most suitable receiving equipment. Even under these conditions, when the SNR of the eavesdropper is less than 2 dB, the error rate of the eavesdropper becomes 10% or more at the time when the discrimination threshold value using by the eavesdropper is "0". Therefore, when the loss at the transmission channel, and the light intensity and the modulation index of the transmitting signal light are designed so that the SNR of the receiver becomes more than −10 dB, the error rate of the receiver can be made to be 5% or less, and the cryptographic key can be distributed in high security. Consequently, the shared cryptographic key can be distributed in high security, as far as these conditions are satisfied. And transmitting the clock light needs to synchronize the receiving apparatus with the transmitting apparatus, and by comparing the light intensity and the modulation index from the transmitting end with the expectation value at the receiving end, the receiving end can detect an abnormal state of the optical transmission channel such as that the eavesdropper resends only a part of bits by strong light. As mentioned above, according to the present invention, the cryptographic key distribution method, which can use an existing optical communication network by using coherent light, can be realized in high security.

According to the present invention, the discrimination threshold value at the receiving end can be set so that the error rate of the receiver becomes smaller than a designated value by the amplitude of signals detected by the receiver.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
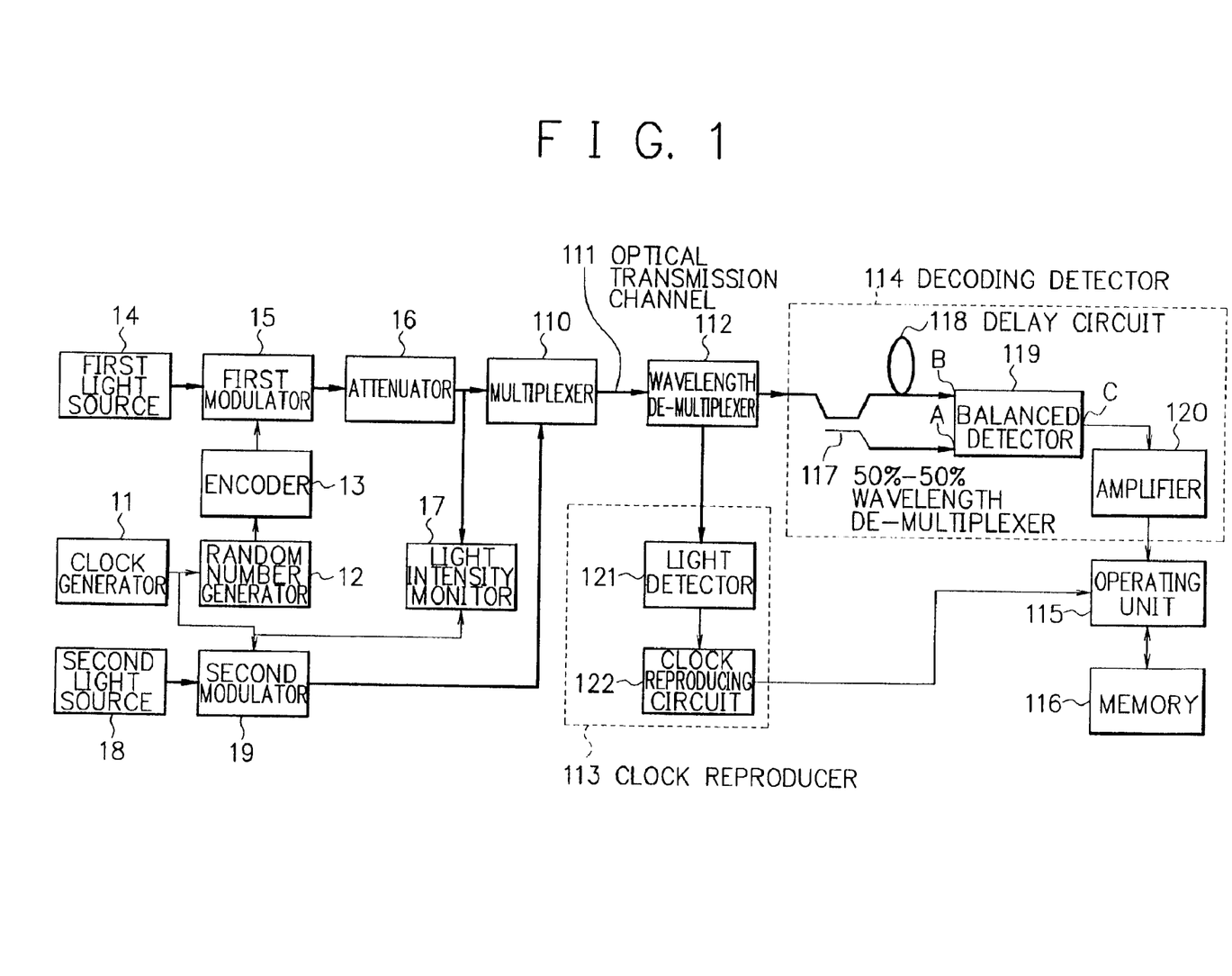
FIG. 1 is a block diagram showing a structure of a cryptographic key distribution apparatus at an embodiment of the present invention.

Referring now to the drawings, embodiments of the present invention are explained in detail. FIG. 1 is a block diagram showing a structure of a cryptographic key distribution apparatus at an embodiment of the present invention. As shown in FIG. 1, the cryptographic key distribution apparatus at the embodiment of the present invention consists of a transmitting apparatus (sender) and a receiving apparatus (receiver), and the transmitting apparatus and the receiving apparatus are connected through an optical transmission channel.

The transmitting apparatus consists of a clock generator 11, a random number generator 12, an encoder 13, a first light source 14, a first modulator 15, an attenuator 16, a light intensity monitor 17, a second light source 18, a second modulator 19, and a multiplexer 110. And wavelengths of light generating by the first light source 14 and the second light source 18 are different.

The receiving apparatus consists of a wavelength de-multiplexer 112, a clock reproducer 113, a decoding detector 114, and an operating unit 115. A memory 116 is connected to the operating unit 115. The decoding detector 114 consists of a 50%-50% wavelength de-multiplexer 117 (dividing ratio is 1 to 1), a delay circuit 118, a balanced detector 119, and an amplifier 120. The clock reproducer 113 consists of a light detector 121, and a clock reproducing circuit 122. And the receiving apparatus is connected to the transmitting apparatus by an optical transmission channel 111.

In this, as the first and second light sources 14 and 18, and as the first and second modulators 15 and 19, existing devices can be used. For example, a semiconductor laser can be used as the first and second light sources 14 and 18. And as the first and second modulators 15 and 19, an electro-optical device such as a Pockels cell and a magneto-optical device such as a Faraday element can be used. However, at the case that a semiconductor electric field absorbing type optical modulator used a material being the same material of the semiconductor laser is used as the first and second modulators 15 and 19, the semiconductor electric field absorbing type optical modulator can be integrated on the same substrate on which the semiconductor laser is mounted in a monolithic state, and this has an advantage. Therefore, it is recommendable that the semiconductor electric field absorbing type optical modulator is used.

A Y shaped branching waveguide or a multi mode interference waveguide can be used as the multiplexer 110. An array waveguide grating or a filter using photonic crystal can be used as the wavelength de-multiplexer 112. And a directional coupler can be used as the 50%-50% wavelength de-multiplexer 117, and an optical fiber can be used as the delay circuit 118.

The clock reproducing circuit 122 makes a waveform obtained at the light detector 121 rectangular, therefore an existing waveform forming circuit can be used as the clock reproducing circuit 122. A micro computer or a personal computer (PC) can be used as the operating unit 115. At the case that the PC is used, the PC has a built-in memory, therefore the memory 116 does not need to be installed independently.

Figure 2:
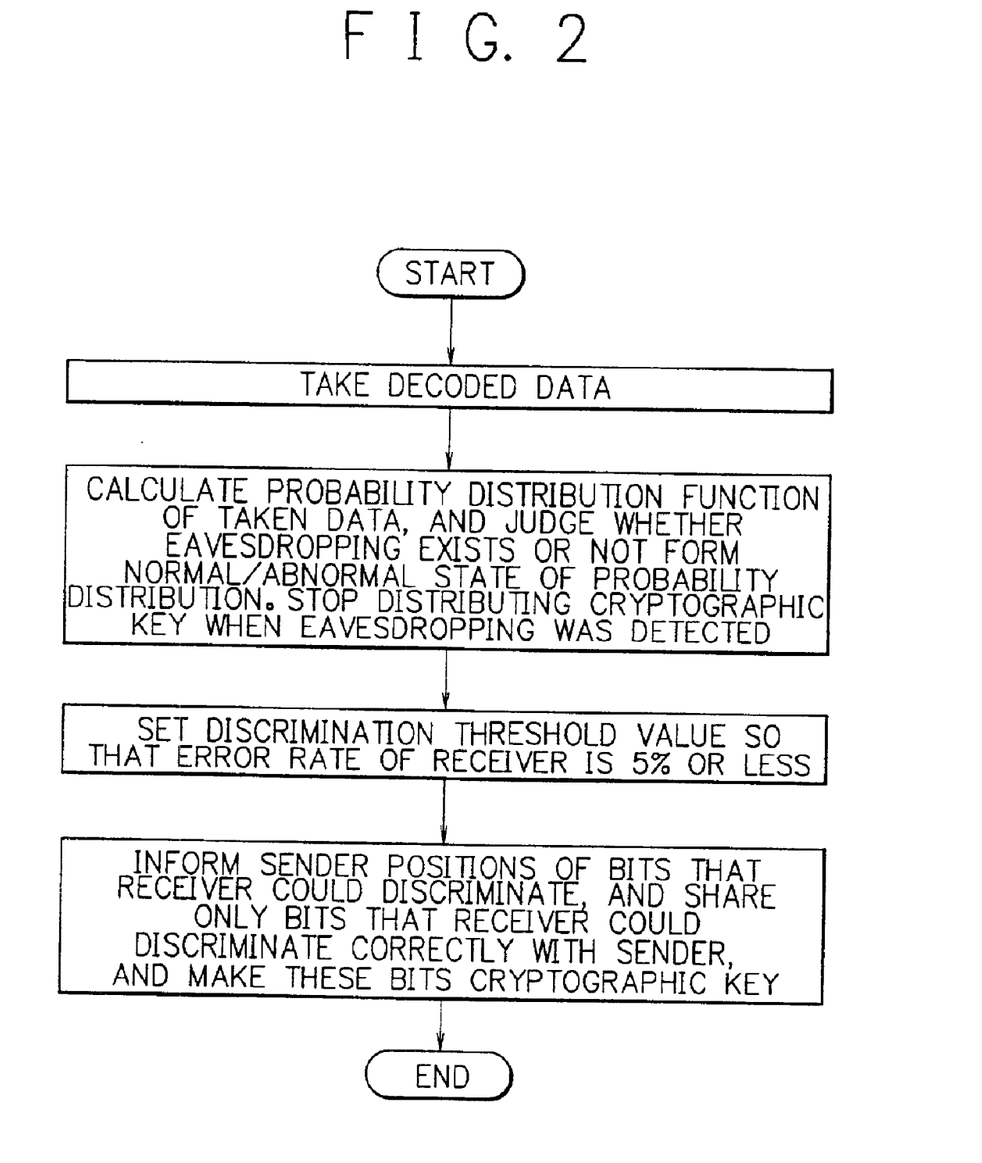
FIG. 2 is a flowchart showing processes at an operating unit in the cryptographic key distribution apparatus at the embodiment of the present invention.
Figure 3:
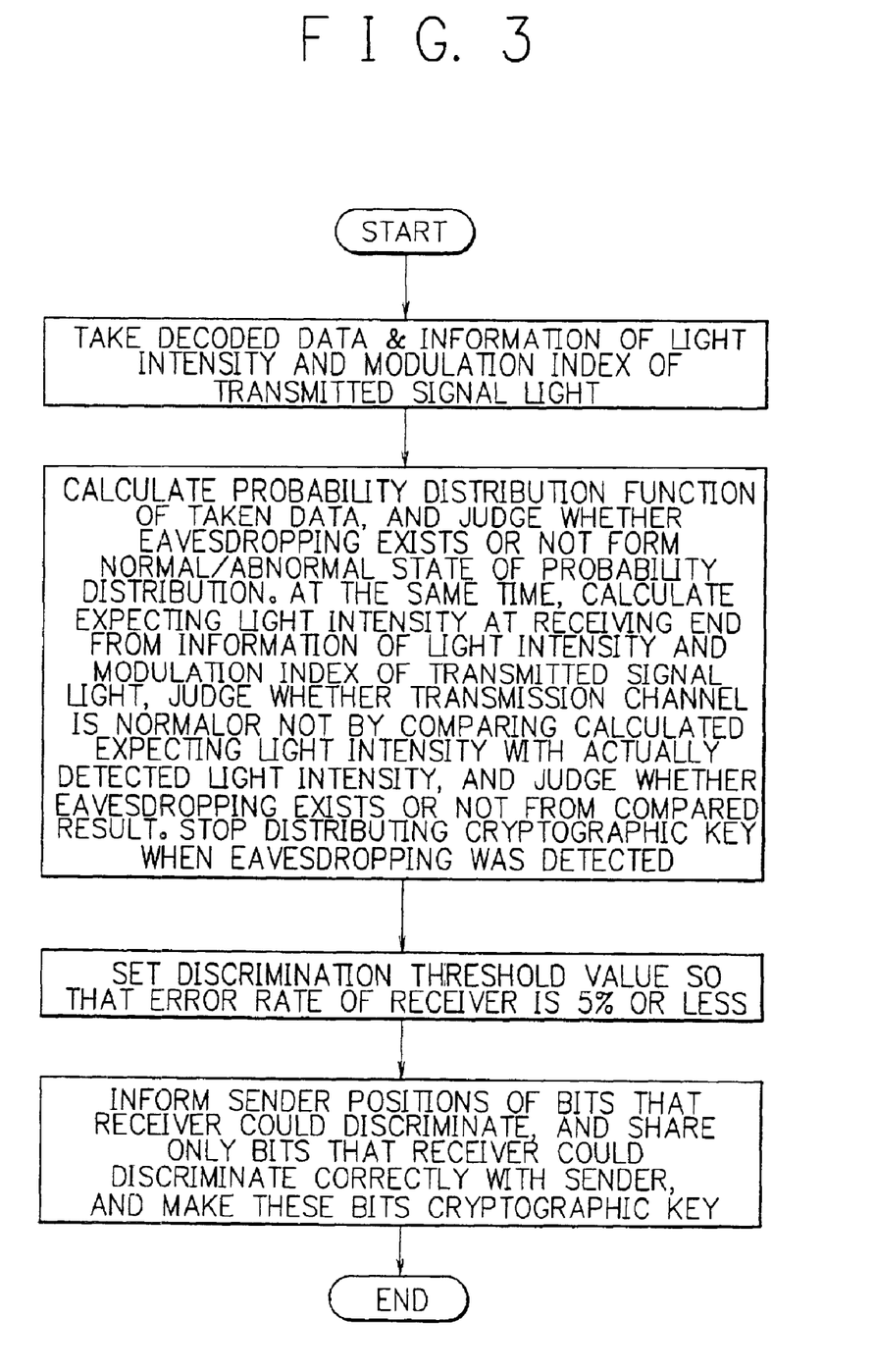
FIG. 3 is a flowchart showing processes at the operating unit in the cryptographic key distribution apparatus at another embodiment of the present invention.

FIG. 2 is a flowchart showing processes at the operating unit 115 in the cryptographic key distribution apparatus at the embodiment of the present invention. And also FIG. 3 is a flowchart showing processes at the operating unit 115 in the cryptographic key distribution apparatus at another embodiment of the present invention. The operating unit 115 operates corresponding to the processes shown in FIGS. 2 and 3. The processes at the operating unit 115 are explained in detail later.

The random number generator 12 generates a certain number of binary random numbers at every transmission of clock signals from the clock generator 11. The encoder 13 encodes the obtained random numbers to Manchester codes in which a raise is made to be "0" and a fall is made to be "1". The coded random numbers modulate light outputted from the first light source 14 at the first modulator 15.

And also the clock signals generated from the clock generator 11 modulate light outputted from the second light source 18, whose wavelength is different from that from the first light source 14, at the second modulator 19. The light modulated by the coded random numbers at the first modulator 15 is attenuated at the attenuator 16 and the light becomes signal light whose light intensity is very weak being about the same level of noise. The light intensity of this attenuated signal light is satisfied with equations (1) and (2) mentioning below.

As a result, even when an eavesdropper eavesdrops signals by using any receiving equipment at a place near to the transmitting apparatus, the SNR at the receiving equipment of the eavesdropper becomes less than 2 dB, and also the SNR at the receiving apparatus becomes more than −10 dB. The light modulated by the coded random numbers at the first modulator 15 and attenuated at the attenuator 16 (signal light) and the light outputted from the second modulator 19 and modulated by the clock signals (clock light) are multiplexed at the multiplexer 110 and after this the multiplexed light is transmitted to the receiving apparatus through the optical transmission channel 111.

$$\delta \leq 0.8/N \quad (1)$$

$$2\delta L^2 N^2 / Nn > 0.1 \quad (2)$$

In this, N is the number of photons of signal light, δ is a modulation index of the signal light, L is a loss at the transmission channel, and Nn is a noise level of the receiving apparatus and is a known value measured beforehand.

At the receiving apparatus, the wavelength de-multiplexer 112 divides the inputted signals into the clock light and the signal light. The clock light is converted to electric signals at the light detector 121, and after this the waveform of the electric signals is made to be rectangular and clock signals are reproduced at the clock reproducing circuit 122 and the clock signals become clock signals at the receiving apparatus. The signal light is the Manchester codes, in order to decode the Manchester codes, the signal light is divided into two parts at the 50%-50% wavelength de-multiplexer 117, and one of the two parts is delayed by a half clock at the delay circuit 118. Each of the divided signal light is detected and decoded at the balanced detector 119, which detects and outputs the difference between two input signals as a signal.

Figure 4:
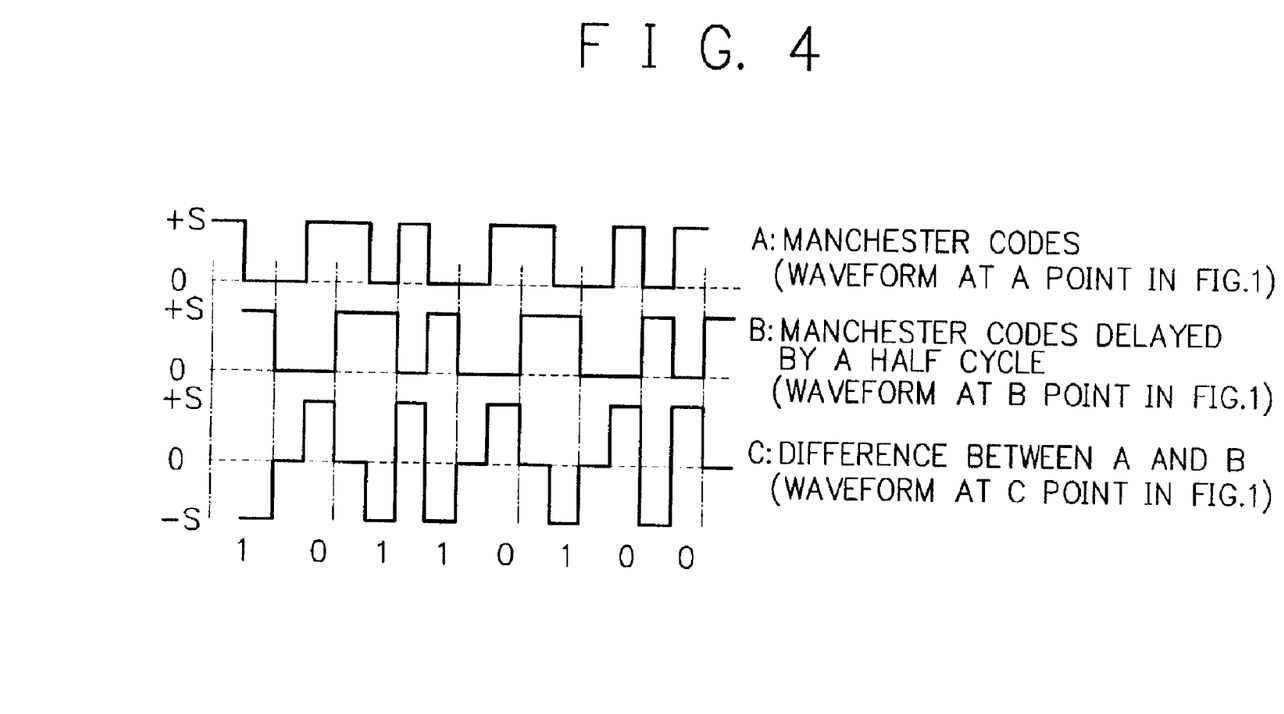
FIG. 4 is a diagram showing a method decoding Manchester codes at a balanced detector in the cryptographic key distribution apparatus at the embodiment of the present invention.

FIG. 4 is a diagram showing a method decoding Manchester codes at the balanced detector 119 in the cryptographic key distribution apparatus at the embodiment of the present invention. In FIG. 4, A shows Manchester codes (waveform) at the A point being one input point to the balanced detector 119 in FIG. 1, B shows Manchester codes (waveform) at the B point being the other input point to the balanced detector 119 in FIG. 1 and are delayed by a half clock (a half cycle) for the Manchester codes at the point A, and C shows the waveform decoded at the balanced detector 119, that is, at the point C being the output point of the balanced detector 119 in FIG. 1 and is the difference between the Manchester codes at the points A and the B. As shown in FIG. 4, the Manchester codes are decoded to be "0" and "1" being positive and negative voltage signals whose absolute values are equal by making the back half of outputting slots signals.

Figure 5:
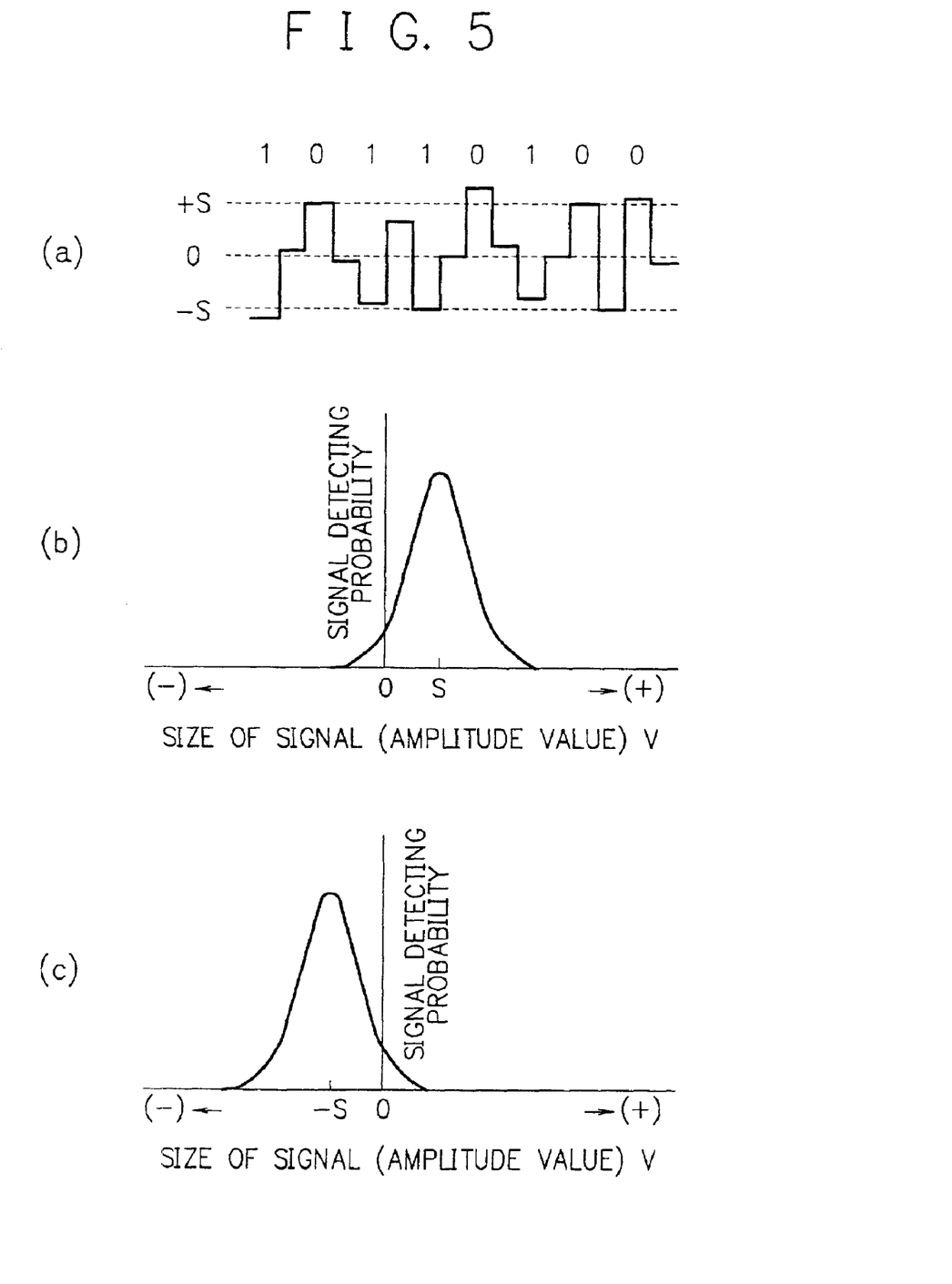
FIGS. 5(a), 5(b), and 5(c) are diagrams showing voltage signals of the signal light decoded at the balanced detector including the fluctuation caused by the noise and the probability distributions of the voltage signals obtained by several times of the detection at the embodiment of the present invention.

Noise was added to the signal light detected at the balanced detector 119, therefore some fluctuation exists in the detected result at the balanced detector 119. FIG. 5 is a diagram showing voltage signals of the signal light decoded at the balanced detector 119 including the fluctuation caused by the noise and the probability distributions of the voltage signals obtained by several times of the detection at the embodiment of the present invention. That is, in FIG. 5, the voltage signals decoded to be "0" and "1" including the fluctuation of the signal light caused by the noise at the receiving apparatus are shown. And also in FIG. 5, the probability distributions, that is, the frequency (occurrence times) distributions of the "0" and "1" by the several times of the detection are shown. In FIG. 5, (a) shows a voltage signal waveform decoded to be "0" and "1" at an instant of fluctuating voltage signals, corresponding to the C in FIG. 4. And in FIG. 5, (b) shows the probability distribution of the "0" and (c) shows the probability distribution of the "1". In FIGS. 5(b) and (c), the horizontal axis shows the size of the decoded signal and the vertical axis shows the frequency (occurrence times), that is, the probability in which the signals are detected. The balanced detector 119 cancels direct current (DC) components, therefore the probability distributions P (V) of the decoded outputs "0" and "1" obtained at the balanced detector 119 become symmetry for the voltage value V=0 each other.

Figure 6:
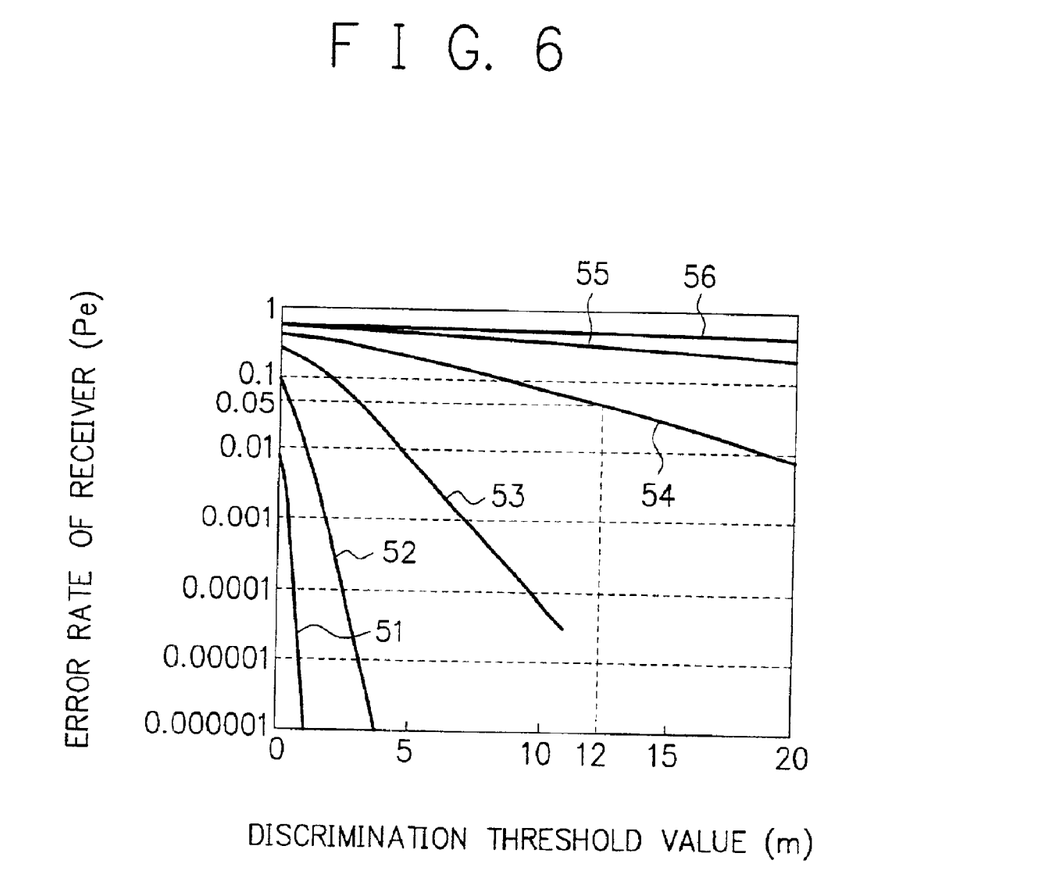
FIG. 6 is a graph showing the relation between a discrimination threshold value $V_{th}$ and an error rate of the receiver Pe at the time when the receiver uses that the discrimination threshold value $V_{th}$ is not "0" at the embodiment of the present invention.

The signals obtained at the balanced detector 119 are amplified at the amplifier 120, after this, the amplified signals are converted to digital signals every clock at the operating unit 115 and the digital signals are stored in the memory 116. The operating unit 115 calculates probability distribution functions of the digital signals memorizing in the memory 116 after the sender finished sending some random numbers. And the operating unit 115 confirms that the calculated probability distribution functions can be the approximation of two Gauss type functions corresponding to the "0" and "1" as shown in FIG. 5. When abnormal states, such as increasing/decreasing the dispersion, the deterioration of the symmetry, and the change of the peak voltage value, are found in the probability distributions, these show the presence of the eavesdropper, therefore the signals obtained this time are discarded. When the abnormal states are not found in the probability distributions, it can be judged that the eavesdropper does not exist, and the bit value of each bit is discriminated based on the discrimination threshold value $V_{th}$. At this time, the discrimination threshold value $V_{th}$ has plus and minus signs for the bit values "0" and "1", and $V_{th}=\pm mS$ being a finite number whose absolute value is the same is used. In this, S is an average value of amplitude of the signals and "m" is 0 or a positive number. That is, when the signal output V is smaller than $-mS$, it is discriminated that the bit value is "1", when the signal output V is larger than mS, it is discriminated that the bit value is "0", and it is discriminated to be "not discriminative" when the signal output V is between the $-mS$ and mS. At the case that the noise is large, when the absolute value $|V_{th}|$ of the discrimination threshold value $V_{th}$ is made to be large, that is, when the "m" is made to be large, the number of bits that can be discriminated is decreased, however the error rate for the bits that could be discriminated can be made to be small. At this time, the discrimination threshold value being "m" is decided so that the error rate at the receiving apparatus becomes 5% or less, based on an equation (7) and FIG. 6. The equation (7) and FIG. 6 are explained later.

After finished transmitting a random number sequence, the positions of the bits that the receiver could discriminate are transmitted to the sender through a transmission channel being independent of the cryptographic key transmission channel, for example, through a classical transmission channel such as an existing optical communication network, a radio channel, and a telephone network. The bits that the receiver could not discriminate and the bits that the receiver discriminated by mistake are discarded. And the bits that the receiver could discriminate are taken out. With this, the sender and the receiver can share the random number sequence in which errors are small. This shared random number sequence is made to be the cryptographic key.

If an eavesdropper takes out a part of light from the transmission channel, the noise between the receiver and the eavesdropper does not correlate with each other, therefore the eavesdropper cannot know beforehand what bits the receiver can discriminate. Consequently, in order to prevent to miss the eavesdropping, the eavesdropper must discriminate all the bits by making the discrimination threshold value "0", and the bits having small errors obtained by the receiver become the bits including errors for the eavesdropper. Therefore, at the case that the noise is large, the error rate becomes large, and the amount of information for the eavesdropper becomes smaller than that for the receiver, and the eavesdropper cannot eavesdrop effectively.

It is possible that the eavesdropper absorbs all light transmitting from the sender and discriminates all the light, and resends the discriminated result to the receiver. However, even at this case, the error rate for the eavesdropper is set to be 10% or more, that is, the light intensity and the modulation index of the transmitting signal light are set to satisfy the equation (1), the discriminated result by the eavesdropper includes errors and the error rate of the receiver increases extraordinarily and the presence of the eavesdropper is exposed. At the case that the eavesdropping is detected, the generation of the cryptographic key is stopped and a fresh cryptographic key is generated and distributed by using another transmission channel. The processes in the operating unit 115 at the embodiment is shown in FIG. 2.

Next, another embodiment of the cryptographic key distribution method of the present invention is explained. In order to share a cryptographic key having much higher security in addition to the cryptographic key distribution method mentioned above, at another embodiment, classical information is exchanged between the sender and the receiver in order to correct errors and strengthen the security in addition to the cryptographic key generating protocol mentioned above. This information is exchanged by two-way communication by using light of the same wavelength band as the clock signal has. The sender transmits the light intensity and the modulation index with the cryptographic key at the same time. And the receiver calculates the expectation value of the light intensity of the receiving light that is supposed from the light intensity information received from the sender and the known transmission channel loss. And the receiver compares the calculated expectation value of the light intensity with the light intensity of the actually received light, and detects whether the transmission channel is normal or not based on the difference between the calculated value and the actually received value. The receiver judges whether the eavesdropper exists or not by using the abnormal state of the detected transmission channel and decides whether stopping or continuing the cryptographic key distribution. The processes of the operating unit 115 at this time are shown in FIG. 3.

The light intensity and the modulation index of the sender, and the discrimination threshold value of the receiver are decided as follows. In this, it is determined that the probability distributions P (V) of signals that the receiver obtains are a Gauss type given by equations (3) and (4).

$$P(V)=(2\Pi\sigma^2)^{-1/2} \exp[-(V-S)^2/(2\sigma^2)] \qquad (3)$$

When the bit value 0 is transmitted.

$$P(V)=(2\Pi\sigma^2)^{-1/2} \exp[-(V+S)^2/(2\sigma^2)] \qquad (4)$$

When the bit value 1 is transmitted.

Where, S is an average value of probability variable V, that is, an average value of amplitude V of signals, and $\sigma$ is the standard deviation of the amplitude V of the signals. At this time, the signal to noise ratio (SNR) $\beta^2$ is expressed in $\beta=S/\sigma$.

When it is decided that $y=(V-S)/\sigma$ for the equation (3), and $y=(V+S)/\sigma$ for the equation (4), and the equations (3) and (4) are standardized, then the equations (3) and (4) are $P(V)=(2\Pi)^{-1/2} \exp[-y^2/2]$, therefore the probability Q (x) in which y becomes larger than x is shown in an equation (5).

$$Q(x)=(2\Pi)^{-1/2}\int_x^{\infty} \exp[-y^2/2]dy \qquad (5)$$

Therefore, the probability that the receiver discriminates the bit value correctly is $Q((m-1)\beta)$ and discriminates the bit value incorrectly is $Q((m+1)\beta)$ by using the discrimination threshold value $V_{th}=\pm mS$. Consequently, the probability F that the receiver discriminates the bit value is shown in an equation (6).

$$F=Q((m-1)\beta)+Q((m+1)\beta) \qquad (6)$$

The probability that the discriminated result is wrong, that is, the error rate of the receiver Pe is shown in an equation (7).

$$Pe=Q((m+1)\beta)/F \qquad (7)$$

Noise between the receiver and the eavesdropper has no correlation, therefore the eavesdropper cannot known beforehand by what bit the receiver discriminates.

Therefore, in order not to miss eavesdropping, the eavesdropper must discriminate all the bits by making the $V_{th}=0$ (m=0). The error rate of the eavesdropper $P^E$ is given in an equation (8) when the SNR of the eavesdropper is $\beta^2$.

$$P^E=Q(\beta) \qquad (8)$$

When the eavesdropper absorbs bits and resends the bits, the error rate of the receiver changes to an equation (9).

$$Pe'=P^E(1-Pe)+(1-P^E)Pe \qquad (9)$$

As it is understandable from the equation (9), at the case that the discrimination threshold value $V_{th}$ is chosen so that the error rate of the receiver Pe becomes 5% when the eavesdropper does not exist, the error rate of the receiver Pe becomes 14% when the error rate of the eavesdropper $P^E$ is 10%, therefore the error rate of the receiver Pe becomes about three times of the initial value when the eavesdropper exists. As mentioned above, the light intensity and the modulation index are set so that the error rate of any eavesdropper $P^E$ exceeds 10%. That is, when the light intensity and the modulation index are set so that the error rate of the eavesdropper $P^E$ can not be corrected, the presence of the eavesdropper, who absorbs bits and resends the bits, can be detected by that the error rate of the receiver Pe' increases extraordinarily.

In this, the reason why the error rate of the receiver Pe is set to be 5% and the error rate of the eavesdropper $P^E$ is set to be 10% is the fact that the error correction cannot be performed when the error rate exceeds 10%. The error rate of the receiver Pe can be set to be any % less than 10% when the error correction can be performed. However, when this value is close to 10%, the error correction becomes difficult, and when this value is very low such as 1%, the transmission of signals becomes difficult. Therefore, the error rate of the receiver Pe is set to be 5% under the consideration of the easiness and difficulty of the transmission and the error correction. Needless to say, the error rate of the receiver Pe can be set to be, for example, 4% or 6%, instead of 5%, as far as this value is less than 10%.

In order to secure the security against eavesdropping, it is enough to set that the eavesdropper cannot correct the errors, therefore it is sufficient that the error rate of the eavesdropper $P^E$ is set to be 10% or more. The most advantageous condition for the eavesdropper, that is, the most disadvantageous condition for the receiver, is that the error rate is 10%. Therefore, when the error rate of the eavesdropper $P^E$ is set to be 10%, the light intensity, the modulation index, and the discrimination threshold value for securing the security against the eavesdropping can be decided even under the most disadvantageous condition for the receiver, therefore the error rate of the eavesdropper $P^E$ is set to be 10%.

In order to secure the security against an attack of interception type, a transmission rate R of the cryptographic key is calculated as mentioning below. This transmission rate R signifies that the rate which the receiver can take out a safety cryptographic key from the bit sequence that the receiver could discriminate, and it is necessary that the transmission rate R is larger than "0" for the transmission of the cryptographic key. The transmission rate R of the cryptographic key is a value that the bit rate Pe (error rate of the receiver) which is lost for the error correction and the information rate (1−Pe) T which is taken by the eavesdropper are subtracted from the amount of Shannon information between the sender and the receiver $I_{AB}=1+Pe \log_2 Pe+(1-Pe) \log_2 (1-Pe)$. That is, the transmission rate R is shown in an equation (10).

$$R = I_{AB} - Pe - (1-Pe)T \quad (10)$$

In this, T is shown in an equation (11) by using the probability p(k) that "i" th in the bit sequence obtained by the receiver is "k" and the probability p(k,l) that respective "i" th in the bit sequences of the receiver and the eavesdropper is "k" and "l" respectively.

$$T = 1 + \log_2[p(0,0)/p(0) + p(0,1)/p(0) + p(1,0)/p(1) + p(1,1)/p(1)] \quad (11)$$

The probability p(k,l) is, $p(0,0) = p(1,1) = (1-P^E)$, $p(0,1) = p(1,0) = P^E$, and $p(0) = p(1) = \frac{1}{2}$ is assumed, then $$T = 1 + \log_2[1 + 2P^E + 2(P^E)^2]$$

As a result, the transmission rate R of the cryptographic key is shown in an equation (12).

$$R = 1 + Pe\log_2 Pe + (1-Pe)\log_2(1-Pe) - Pe - (1-Pe)\{1 + \log_2[1 - 2P^E + 2(P^E)^2]\} \quad (12)$$

Figure 7:
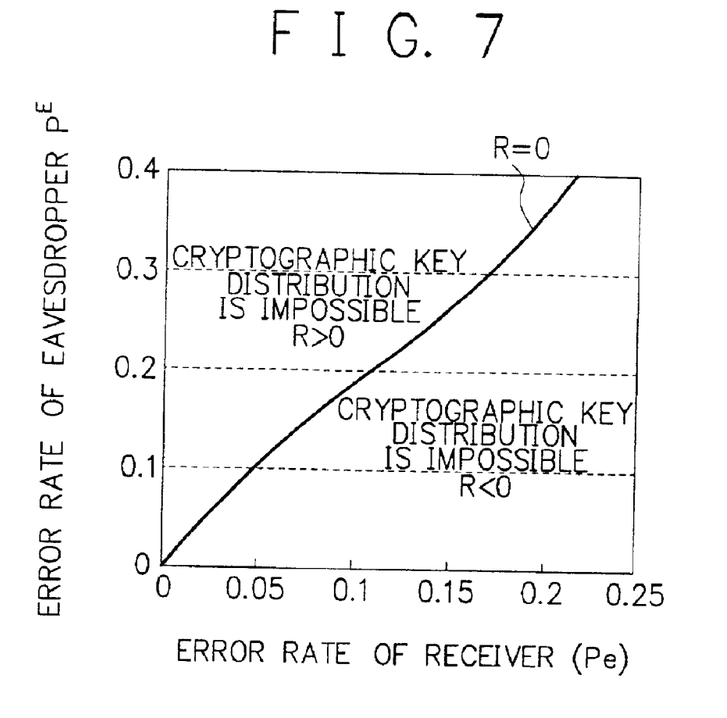
FIG. 7 is a diagram showing regions of the error rate of the receiver Pe and an error rate of an eavesdropper $P^E$ that are required to perform the cryptographic key distribution in high security against an intercepting type attack from the eavesdropper at the embodiment of the present invention.

FIG. 7 is a diagram showing regions of the error rate of the receiver Pe and the error rate of the eavesdropper $P^E$ that are required to perform the cryptographic key distribution in high security against the intercepting type attack from the eavesdropper at the embodiment of the present invention. In FIG. 7, the curve shows a curve that satisfies R=0 at the equation (12). The upper region of the curve R=0 is the region that satisfies R>0 of the equation (12) and the region in which the rate to be able to take out a cryptographic key from the discriminated bit sequence is positive, that is, the region that the cryptographic key can be distributed. And the lower region of the curve R=0 is the region that satisfies R<0 of the equation (12) and the region in which the rate to be able to take out a cryptographic key from the discriminated bit sequence is negative, that is, the region that the cryptographic key cannot be distributed.

As shown in FIG. 7, when the error rate of the eavesdropper $P^E$ is made to be 10%, that is, the most advantageous error rate for the eavesdropper in the error rates being not capable of correcting errors, the error rate of the receiver Pe is made to be 5% or less, with this, the security against the intercepting type attack can be secured. Therefore, when the conditions having high security against the absorbing and resending type attack mentioned above are considered, in order to secure the security against both the absorbing and resending type attack and the intercepting type attack, it is desirable that the error rate of the receiver Pe is made to be 5% or less.

Figure 8:
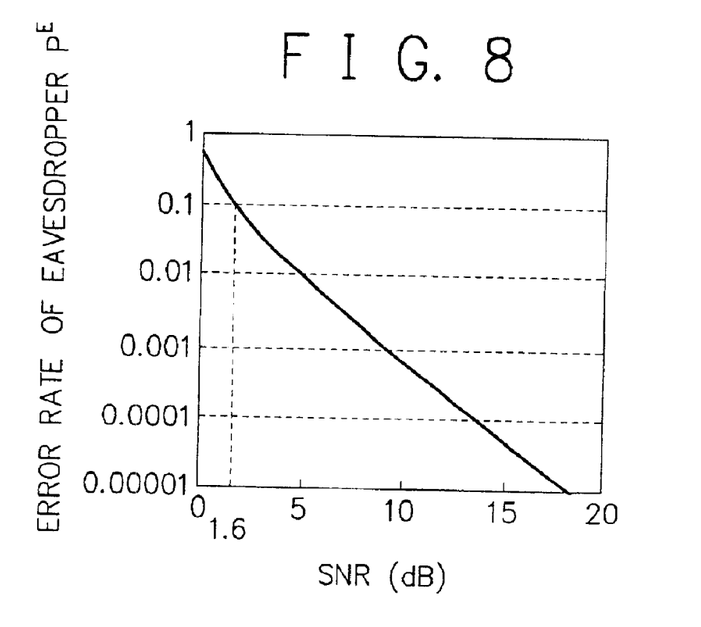
FIG. 8 is a diagram showing the relation between the SNR of the eavesdropper and the error rate of the eavesdropper $P^E$ at the time when the discrimination threshold value $V_{th}=0$ at the embodiment of the present invention.

As mentioned above, the error rate of the eavesdropper $P^E$ is given by the equation (8). FIG. 8 is a diagram showing the relation between the SNR of the eavesdropper and the error rate of the eavesdropper $P^E$ at the time when the discrimination threshold value $V_{th}=0$ at the embodiment of the present invention. As shown in FIG. 8, in order to make the error rate of the eavesdropper $P^E$ 10% or more, the SNR of the eavesdropper is enough to be less than 1.6 (about 2) dB. At the case that the eavesdropper is at a more advantageous situation, that is, the eavesdropper is close to the receiving end and has an ideal detector limited by shot noise, when the average number of photons inputting to the optical transmission channel is N and the number of photons is changed to $N(1 \pm \delta)$ by the modulation, the SNR of the eavesdropper becomes $2\delta N$. Therefore, in order to make the SNR of the eavesdropper less than 1.6 (about 2) dB, the modulation index δ is decided to satisfy the equation (1) as mentioned before.

$$\delta \leq 0.8/N \quad (1)$$

FIG. 6 is a graph showing the relation between the discrimination threshold value $V_{th}$ and the error rate of the receiver Pe at the time when the receiver uses that the discrimination threshold value $V_{th}$ is not "0" at the embodiment of the present invention. In this, the discrimination threshold value $V_{th} = \pm mS$, and S is an average value of amplitude of signals and $m \neq 0$. In FIG. 6, several curves are the results calculated by the equation (7) by using several values of the SNR. In FIG. 6, the vertical line shows the error rate of the receiver Pe and the horizontal line shows "m" value in the discrimination threshold value $V_{th} = \pm mS$.

In FIG. 6, curves 51, 52, 53, 54, 55, and 56 show the relation between the "m" value of the discrimination threshold value $V_{th}$ and the error rate of the receiver Pe at the time when the SNR values are 7.8 dB, 2.65 dB, −3.28 dB, −9.25 dB, −15.1 dB, and −21.4 dB respectively. As shown in FIG. 6, when the SNR is −15.1 dB (the curve 55) and the SNR is −21.4 dB (the curve 56), even when the "m" value is made to be large, that is, the discrimination threshold value $V_{th}$ is made to be large, the error rate of the receiver Pe cannot be 5% or less. When the SNR is −9.25 dB (the curve 54), the discrimination threshold value $V_{th}$ can be chosen so that the error rate of the receiver Pe is 5% or less, that is, the error rate of the receiver Pe has the high security against both the absorbing and resending type attack and the intercepting attack. Consequently, in order to make the error rate of the receiver Pe 5% or less, it is understandable that the SNR of the receiver Pe is required to be more than −10 dB.

And when the SNR is −9.25 dB (the curve 54), the discrimination threshold value $V_{th}$ must be made to be a value being larger than the average signal intensity S (average value of amplitude of signals) is multiplied by about 12 ($m \geq 12$), that is, about 12 times as many as the average signal intensity S is required. And when the SNR is −3.28 dB (the curve 53), the discrimination threshold value $V_{th}$ is enough being a value that the average signal intensity S is multiplied by about 3 ($m \geq 3$). When the discrimination threshold value $V_{th}$ is made to be large, the error rate of the receiver Pe is lowered, however at the same time the number of discriminating bits decreases, therefore it is better that the discrimination threshold value $V_{th}$ is as low as possible under the conditions regarding the error rate are satisfied.

When the average number of photons that are received by the receiver is Nr and the noise strength is Nn, the SNR becomes $2\delta Nr^2/Nn$. The loss L in the optical transmission channel exists, therefore the average number of photons that the receiver receives Nr=LN becomes smaller than the average number of photons N of signal light inputting to the optical transmission channel. As mentioned above, in order to make the error rate of the receiver Pe 5% or less, the SNR of the receiver must be more than −10 dB. Therefore, the loss L that can be admitted in the optical transmission channel, the average number of photons N inputting to the optical transmission channel, and the modulation index δ are decided so that the equation (2) is satisfied, that is, the SNR of the receiver becomes more than −10 dB.

$$2\delta L^2 N^2/Nn > 0.1 \quad (2)$$

In this, the noise strength (noise level) Nn is measured beforehand.

At the embodiments of the present invention mentioned above, Manchester codes, in which the probability distributions of outputs from the detector for the "0" and "1" signals become symmetry, are used. However, binary phase modulation can be used. At this case, since the obtaining SNR is different from the embodiments of the present invention, the modulation index and the discrimination threshold value are changed so that the conditions of the error rate are satisfied.

As mentioned above, according to the cryptographic key distribution method of the present invention, it is clear that the limitation of SNR values of an eavesdropper being capable of theoretically securing the security against the eavesdropper. And also it is clear that the relation between an optical transmission channel loss, and light intensity and modulation index of transmitting light for performing the cryptographic key distribution in high security, therefore the system designing can be performed with actual conditions. Moreover, a method that judges an abnormal state of the optical transmission channel is given. Therefore, at the present invention, the cryptographic key method having high security can be realized by using coherent light that can utilize an existing optical network.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A cryptographic key distribution method at a cryptographic key distribution apparatus in which a sender transmits signal light to a receiver through an optical transmission channel, wherein:

said sender, comprising the steps of:

setting light intensity and a modulation index of outputting signal light so that the signal to noise ratio (SNR) of an eavesdropper is smaller than 2 dB even when said eavesdropper eavesdrops at the sending end by using any receiving equipment and also the SNR of said receiver at the receiving end is larger than −10 dB; and transmitting signal light modulated by modulation signals that a random number sequence was coded, and said receiver, comprising the steps of:

receiving said signal light of said random number sequence transmitted from said sender;

calculating the probability distributions by using the frequency (occurrence times) distributions of said received signal light having fluctuation caused by that noise was added;

judging whether said eavesdropper exists or not based on changes of said probability distributions, and also setting a discrimination threshold value so that the error rate of said receiver is 5% or less;

discriminating the bit value of each bit in said random number sequence based on said discrimination threshold value; and informing said sender of the positions of bits that said receiver could discriminated, and taking out only the bit sequence having no errors in the discrimination, and sharing said bit sequence having no errors with said sender, and wherein:

said shared bit sequence is made to the cryptographic key.

2. A cryptographic key distribution method in accordance with claim 1, wherein:

the random number using in said random number sequence is a binary random number, and said calculated probability distributions have a peak respectively (that is, two peaks) corresponding to said binary number at said receiving end, and the binary random number sequence is coded so that said calculated probability distributions become the probability distributions being symmetry each other.

3. A cryptographic key distribution method in accordance with claim 2, wherein:

Manchester codes are used for coding said binary random number.

4. A cryptographic key distribution method in accordance with claim 2, wherein:

it is confirmed that said calculated probability distributions have said peak respectively (that is, two peaks) and are symmetry corresponding to said binary number (0,1), and when such probability distributions are not confirmed, it is judged that said eavesdropper exists at said cryptographic key distribution, and the distribution of said cryptographic key is stopped and a fresh cryptographic key is distributed again.

5. A cryptographic key distribution method in accordance with claim 1, wherein:

when said cryptographic key is distributed, management information composed of clock signals, said light intensity and said modulation index of said transmitting signal light is transmitted to said receiver by using a transmission channel being independent of said optical transmission channel for said cryptographic key distribution.

6. A cryptographic key distribution method in accordance with claim 5, wherein:

said receiver calculates a light intensity expectation value of receiving signal light, estimating from received light intensity information of said sending end and a known transmission channel loss, and compares said calculated result with the light intensity of actually received signal light, and judges an abnormal state of said optical transmission channel based on the difference between said calculated value and said actually received value, and decides to stop distributing said cryptographic key based on said judged result.

7. A cryptographic key distribution apparatus, comprising:

a transmitting apparatus that radiates signal light modulated by a coded random number sequence;

an optical transmission channel that transmits said signal light radiated from said transmitting apparatus; and a receiving apparatus that receives said signal light transmitted through said optical transmission channel, and wherein:

said receiving apparatus decodes said signal light received through said optical transmission channel, and calculates the probability distributions from the frequency (occurrence times) distributions of decoded signals having fluctuation caused by that noise was added, and judges whether an eavesdropper exists or not based on changes of said probability distributions, and also sets a discrimination threshold value so that the error rate of said receiving apparatus is 5% or less, and discriminates a bit value of each bit of said random number sequence based on said discrimination threshold value, and transmits positions of bits that said receiving apparatus could discriminate to said transmitting apparatus, and wherein:

an average number of photons $N(N \geq 1)$ per one pulse of said signal light radiating from said transmitting apparatus, a modulation index $\delta$ of said signal light radiating from said transmitting apparatus, and a transmission loss L at said optical transmission channel satisfy following equations.

$$\delta \leq 0.8/N$$

$$2\delta L^2 N^2 / Nn > 0.1$$

In this, Nn signifies the noise level of the receiving apparatus.

8. A cryptographic key distribution apparatus in accordance with claim 7, wherein:

said transmitting apparatus, comprising:

a first light source;

a clock generator;

a random number generator that generates random numbers based on clocks generated by said clock generator;

an encoder that encodes said random numbers generated at said random number generator;

a first modulator that modulates light from said first light source based on signals encoded at said encoder and makes said modulated signals signal light;

an attenuator that attenuates light intensity of said signal light outputted from said first modulator to about a noise level;

a second light source that generates light using for clock light;

a second modulator that modulates light from said second light source based on clocks generated at said clock generator and makes said modulated signals clock light; and a multiplexer that multiplexes said signal light outputted from said attenuator and said clock light outputted from said second modulator and outputs said multiplexed light to said optical transmission channel, and said receiving apparatus, comprising:

a wavelength de-multiplexer that divides received signals transmitted through said optical transmission channel into said signal light and said clock light;

a clock reproducer that converts said clock light inputted from said wavelength de-multiplexer into electric clocks;

a decoding detector that decodes said signal light inputted from said wavelength de-multiplexer and converts said decoded signal light into electric signals; and an operating unit that measures the frequency (occurrence times) distributions of said electric signals having fluctuation caused by that noise was added from said decoding detector based on said clocks from said clock reproducer, and calculates the probability distributions from said frequency distributions, and judges whether an eavesdropper exists or not based on changes of said probability distributions, and sets said discrimination threshold value so that the error rate of said receiving apparatus is 5% or less, and discriminates a bit value of each bit of said random number sequence based on said discrimination threshold value, and transmits positions of bits that said operating unit could discriminate to said transmitting apparatus.

9. A cryptographic key distribution apparatus in accordance with claim 8, wherein:

said clock reproducer, comprising:

a light detector that converts said clock light into electric signals; and a clock reproducing circuit that forms said electric signals from said light detector into waveforms, said decoding detector, comprising:

a 50%-50% wavelength de-multiplexer that divides said signal light inputted from said wavelength de-multiplexer into two components at the dividing ratio is 1 to 1;

a delay circuit that delays one of said signal light divided at said 50%-50% wavelength de-multiplexer; and a balanced detector that converts the difference between said signal light inputted from said delay circuit and said signal light inputted from said 50%-50% wavelength de-multiplexer into electric signals.

10. A cryptographic key distribution apparatus in accordance with claim 8, wherein:

said encoder in said transmitting apparatus encodes said random number sequence so that said probability distributions calculated at said receiving apparatus has a peak respectively (that is, two peaks) corresponding to binary and are symmetry with each other.

11. A cryptographic key distribution apparatus in accordance with claim 7, wherein:

Manchester codes are used at coding said random number sequence.

\* \* \* \* \*